United States Patent [19]

Jafarey

[11] Patent Number: 4,856,379
[45] Date of Patent: Aug. 15, 1989

[54] NON-JAMMING ROTARY MECHANICAL ACTUATOR

[75] Inventor: Nozar Jafarey, Long Beach, Calif.

[73] Assignee: Allied-Signal Inc., Morris Township, Morris County, N.J.

[21] Appl. No.: 100,146

[22] Filed: Sep. 22, 1987

[51] Int. Cl.$^4$ ............................. F16H 1/28; F16D 9/00
[52] U.S. Cl. ........................................ 74/805; 403/356; 464/32
[58] Field of Search ............... 74/674, 750 R, 768, 74/769, 804, 805; 403/2, 358, 356; 464/32

[56] References Cited

U.S. PATENT DOCUMENTS

| | | | |
|---|---|---|---|
| 1,589,903 | 6/1926 | Ruggles | 192/56 R |
| 2,124,965 | 7/1938 | Lind | 192/150 |
| 2,838,952 | 6/1958 | Seeliger | 74/805 |
| 2,953,934 | 9/1960 | Sundt | 74/804 X |
| 2,966,808 | 1/1961 | Grudin | 74/805 |
| 3,008,355 | 11/1961 | Grudin | 74/768 |
| 3,071,945 | 1/1963 | Shomo | 464/32 |
| 3,075,332 | 1/1963 | Krupp et al. | 192/150 X |
| 3,144,791 | 8/1964 | Menge | 74/805 |
| 3,208,293 | 9/1965 | Boehm | 74/805 |
| 3,236,106 | 2/1966 | Krupp et al. | 74/567 X |
| 3,478,623 | 11/1969 | Noguchi | 74/804 |
| 3,640,150 | 2/1972 | Leiner et al. | 74/768 X |
| 4,347,715 | 9/1982 | Carman | 464/32 |
| 4,348,132 | 9/1982 | Mullenberg | 403/356 |
| 4,603,594 | 8/1986 | Grimm | 74/89.15 |
| 4,721,016 | 1/1988 | Burandt | 74/768 X |
| 4,742,730 | 5/1988 | Dorn et al. | 74/674 X |

Primary Examiner—Dwight G. Diehl
Assistant Examiner—Harold F. Macris
Attorney, Agent, or Firm—J. Henry Muetterties; David B. Abel

[57] ABSTRACT

A non-jamming rotary mechanical actuator for aircraft control surfaces includes a pair of fixed ring gears separated by a moving ring gear. An end plate having a central bore therethrough and a bearing member for rotatably supporting a shaft is mounted at each outer side of said pair of fixed ring gears. Each ring gear has an internal gear surface. The shaft includes an integral inner cam member having a first offset and an outer cam member having a second offset. In driving relationship with said outer cam member is a compound gear having three sets of gear teeth for intermittent contact with said internal gear surfaces of the three ring gears. When a shear member located between the two cam members is broken due to torque overload, the cam members rotate relative to each other so that the compound gear loses contact with the ring gears, thus preventing jamming.

22 Claims, 4 Drawing Sheets

NON-JAMMING ROTARY MECHANICAL ACTUATOR

BACKGROUND OF THE INVENTION

This invention relates to planetary gear type rotary mechanical actuators and more particular to an actuator which is used in series with at least one other actuator and which disconnects itself from the series and from the load if it jams and allows the transmission of power to the other actuators in the series.

In aircraft flight control, actuators are used on the leading edge flaps, the trailing edge flaps, ailerons, flaperons, and rudders in order to adjust the surfaces to the desired position. Trailing edge surfaces and rudders are referred to as the primary flight control surfaces since their position is critical in aircraft control. It is imperative therefore that control of these flaps or surfaces is not compromised. Until now, because of the possibility of jamming of the rotary mechanical actuators, the primary flight control surfaces have used linear hydraulic actuators since they typically fail "open" and it is easy to override the hydraulic actuator in order to use a back up actuator to lock the control surface in a neutral position.

On the other hand, the leading edge of an aircraft wing is referred to as the secondary flight control surface since the loss of its use restricts aircraft performance, but does not cripple the aircraft. Because of this difference, mechanical actuators, either linear or rotary, are used on the leading edge of an aircraft. If an actuator jams, it is permissible that the flap be allowed to lock in the jammed position. However, a jammed actuator can cause damage to the aircraft wing if one continues to drive the jammed actuator. Therefore, there is a need for an actuator which is designed to reduce the possibility of jamming and if it jams, to disconnect itself from the actuation system and to allows the transmission of the driving torque to the other actuators downstream of the jammed actuator.

Furthermore, an actuator which is used in series with several other actuators and which can disconnect itself from the system if it becomes jammed, can be used on the primary flight control surface was well as the secondary flight control surfaces.

SUMMARY OF THE INVENTION

It is an object of the present invention to provide a mechanical actuator which, if it jams, disconnects itself from the load and a series of actuators, yet allows the driving force to be transmitted therethrough.

It is another object of this invention to provide a mechanical actuator having a single compound planetary gear which is driven by a shaft having an offset.

It is still another object of this invention to provide an input shaft having a two piece offset circular cam and including a shear element between the two pieces.

In accordance with the present invention a non-jamming rotary mechanical actuator comprises a moving ring gear and a fixed ring gear on each side of said moving ring gear. Each ring gear includes an internal gear surface about an opening therethrough and an attachment means for securing said ring gear to either the support structure in the case of the fixed ring gear or to a load in the case of the moving ring gear. The actuator further includes a side plate having a central bore therethrough secured over the openings in said outermost sides of said fixed gear rings; bearing mounted within said side plate bore; a shaft; and a means for driving said shaft. The shaft includes a cam offset extending generally the length of the shaft between said two side plates. The cam offset comprises an inner or first cam member having a desired first offset from said axis of said shaft and an outer or second cam member having a second offset. Each cam member has an axially extending slot formed therein into which a shear member is press or interference fit. The first and second offset are sized so that when the second cam member is rotated approximately 180° from its principal operating position, it has an axis which coincides with the axis of said shaft. This feature unloads the compound planetary gear from engagement with the fixed and moving ring gears if the shear member fails.

DETAILED DESCRIPTION OF THE INVENTION

Figure 1:
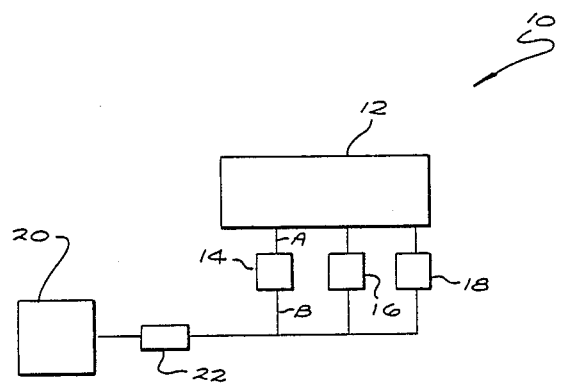
FIG. 1 is a schematic design of a prior art actuation system.

FIG. 1 is a schematic depiction of a typical actuation system 10 for a flight control surface. As shown, the flight control surface or flap or in generic terms the load 12 is driven by a series of actuators; in this case three actuators 14, 16 and 18 which are in series. The series of actuators is driven by a prime mover or motor 20. A fuse 22 is located between the prime mover 20 and the actuators 14, 16 and 18. A jammed actuator 14 at Point A will cause the load 12 to lock in the jammed position. As explained above, this is unacceptable if the load 12 represents the primary flight control surface and may or may not be acceptable if load 12 represents the secondary flight control system.

If a fuse 22 is not included in the system, the prime mover 20 will continue to operate until a weak link in the system is broken, such as at Point B. The break will disconnect the prime mover 20 from actuator 14, thereby locking the load 12 at whatever position actuator 14 is in at the time it is disconnected. Prime mover 20 will continue to drive actuators 16 and 18 even though the load is locked at actuator 14. This causes extensive damage to the actuation system and/or the load and is therefore unacceptable.

Figure 2:
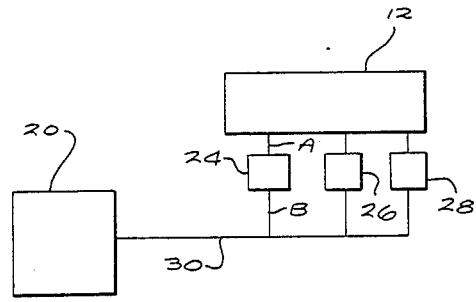
FIG. 2 is a schematic diagram of the actuation system which is used with the present invention.

Unlike the prior art system shown in FIG. 1, an actuator system using an actuator of the present invention is schematically shown in FIG. 2. As shown, the load 12 is driven by three actuators 24, 26 and 28, the details of which are set forth below. The series of actuators are in turn driven by a prime mover 20 via input shaft 30. The fuse 22 is not required with the series of actuators 24, 26 and 28 of the present invention. In the system of FIG. 2, if a failure or jammed actuator occurs at Point A, the input shaft 30 is disconnected from the actuator 24 and then it disconnects the load 12 from the failed actuator at Point B as is described below. Thus the load 12 is unlocked (no longer driven by) from the failed actuator 24, which in turn is isolated from the input shaft 30 allowing the prime mover 20 to continue driving the load 12 through the two good actuators 26 and 28. In this manner, the load 12 will be driven by actuators 26 and 28 and will be hinged by actuator 24 only.

Figure 3:
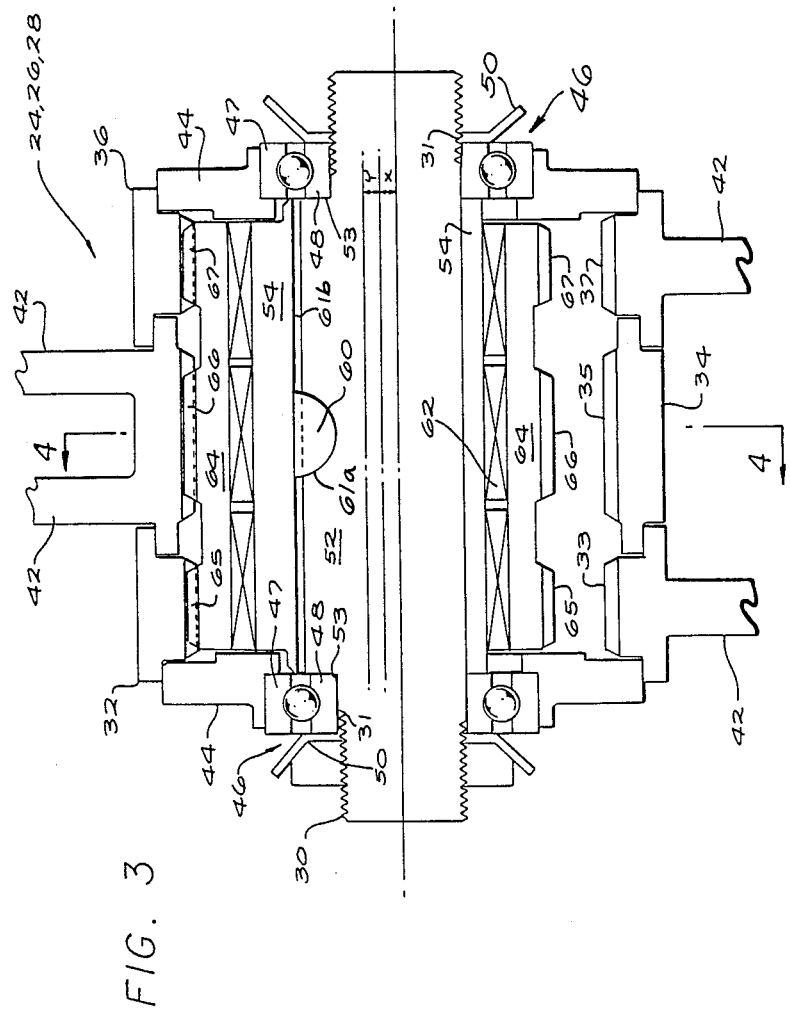
FIG. 3 is a cross-sectional view of the actuator of the present invention.
Figure 4:
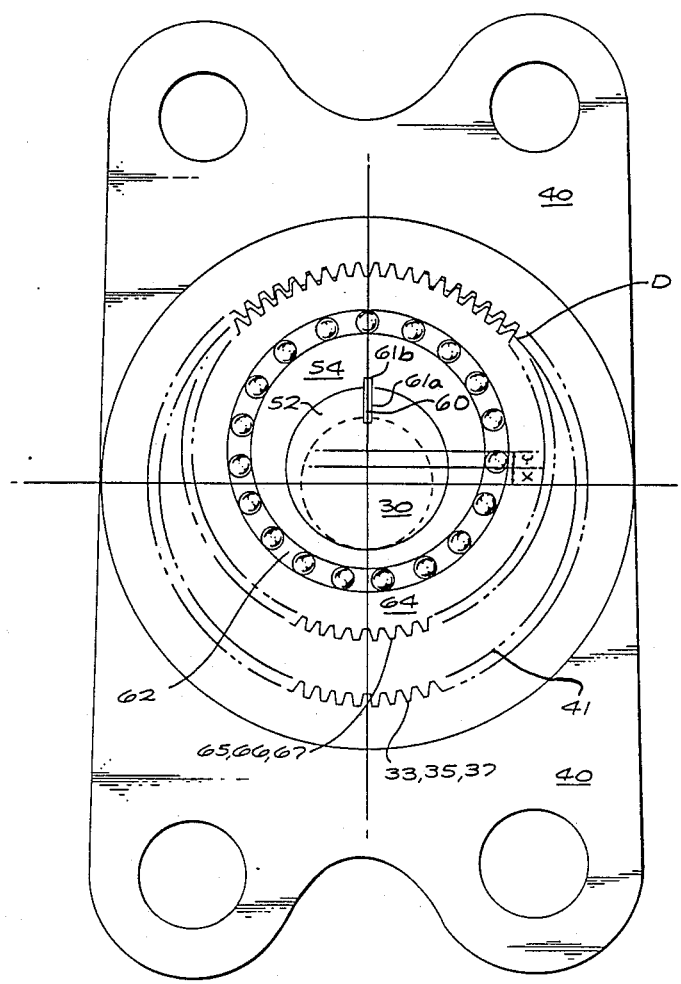
FIG. 4 is a cross-sectional end view taken along line 4—4 in FIG. 3, showing the actuator input shaft during normal operation.
Figure 5:
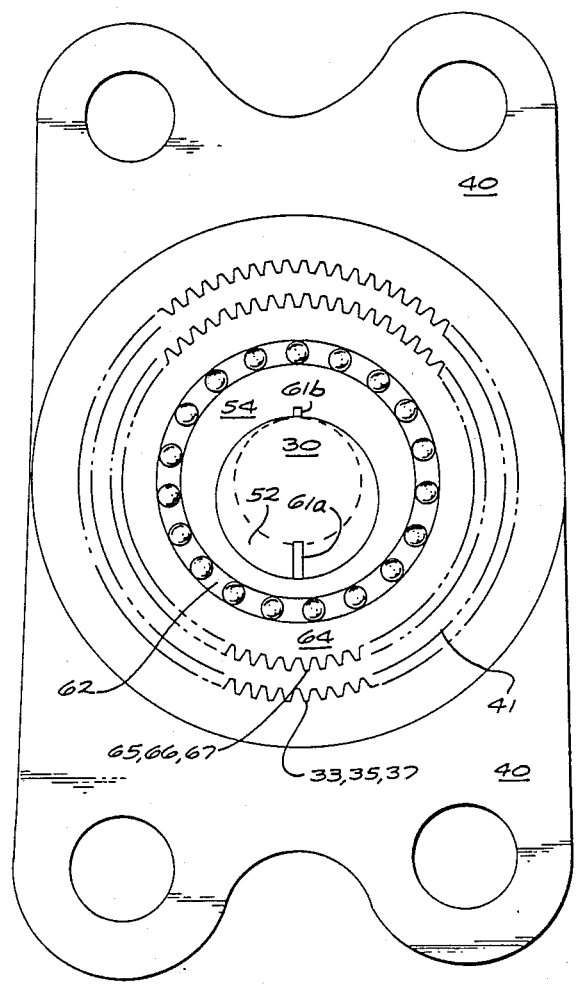
FIG. 5 is a cross-sectional end view taken along line 4—4 in FIG. 3 showing the actuator input shaft during its disengaged condition.

The non-jamming, mechanical actuator 24, 26 or 28 of the present invention is shown in FIGS. 3 to 5. Shown are two fixed ring gears 32 and 36 on either side of a moving ring gear or output gear 34.

Fixed ring gears 32 and 36 are attached to a fixed surface such as the spar of an aircraft wing and the moving ring gear 34 is attached to the control surface or flap of the aircraft wing. Each moving and fixed ring gear comprises a housing member 40 which defines a central bore 41 therethrough and an attachment member 42 integral with the housing member 40. The internal surface of the ring gear which defines the bore is formed as a gear-toothed surface 33, 35 and 37 respectively. As shown, the three ring gears 32, 34, and 36 are placed in side-by-side relationship so that the axis of the bores are aligned.

A pair of side plates or covers 44 enclose the two outermost sides of the fixed ring gear 32 and 36. Ball bearings 46 are secured to the side covers 44 to rotatably support the input shaft 30. Bearings 46 include an outer and an inner race, 47 and 48 respectively. Retainers 50 are threaded onto the shaft 30 in order to secure the ring gears in place. In operation, the retainers 50 and the inner race 48 of bearings 46 rotate with input shaft 30.

The input shaft 30 includes an offset portion thereon which extends substantially the length of the shaft between the two fixed ring gears 32 and 36. The offset is generally formed by the use of a first cam member 52. The first or inner cam member 52 however can be formed integrally with the shaft 30 if desired. As shown, the axis of the first cam member 52 is offset by an amount X along the vertical axis of the shaft 30. The second cam member 54 is cylindrical in shape and includes a bore therethrough, the axis of which is offset by an amount of Y from the axis to the second cam member 54. A key or shear member 60 is press or interference fit into an opening 61 formed by the slots 61a and 61b formed within the outer surface of the inner cam 52 and in the internal surface of the outer cam 54. Second cam member 54 is fit over the inner cam member 52 and aligned so that the offset in the vertical direction is equal to X plus Y as shown in FIG. 4. Furthermore, offset X and Y are sized to be approximately equal.

The input shaft 30 is formed with threads 31 thereon on both sides of the inner cam member 52. A shoulder 53 is formed in each end of the inner cam member 52. The retainers 50 secure the inner race 48 of the bearing 46 between itself and the shoulder 53. In this manner, the outer race 47 locates the axial position of said side plates 44 which in turn capture in a side-by-side relationship, the fixed and moving ring gears 32, 34 and 36. The axis of the input shaft 30 and the axis of the central bore through the adjacent ring gears are aligned.

A cylindrically shaped needle bearing 62 is slid over the second cam member 54 and a compound gear 64 is thereafter positioned over the needle bearing 62. The compound gear 64 has three sets of gear teeth 65, 66 and 67 in order to engage the internal gear surfaces 33, 35 and 37 of the ring gears 32, 34 and 36. In this manner, the gear teeth of the compound gear are engaged with the internal gear surfaces of the ring gear on the top portion thereof. The gear teeth lose contact with the internal gear surfaces as one travels down around the gear teeth of the compound gear 64, until at point D, the contact is broken due to the offset of cams 52 and 54.

During normal operation, the individual gear teeth of the compound planetary gear 64 rotate into and out of contact with the gear teeth of the internal gear surface of each of the fixed and moving ring gears. As the input shaft 30 rotates, the moving ring gear 34 rotates with respect to the two fixed ring gears, 32 and 36, thereby raising or lowering the load 12.

This type of drive mechanism is known as an orbiting compound planetary drive. As the input shaft 30 rotates, the cams 52, 54 force the gear teeth 65, 66 and 67 of compound 64 into engagement with the gear teeth of the internal gear surfaces 33, 35 and 37. Depending on the gear teeth count, the moving ring gear 34 will rotate with respect to the fixed ring gears 32 and 36, in the same or opposite direction as that of the input shaft.

Hence, when using this type of device, the diameter of the central bore 41 can be formed smaller than two inches and still transmit a torque necessary to rotate the moving ring gear. Needle bearing 62 improves the efficiency of the torque transmission between the input shaft 30 and the moving ring gear 34.

If any of the actuators 24, 26, 28 jam, the driving torque transmitted through the input shaft 30 will cause the shear member 60 to shear, which in turn separates the second cam member 54 from the first cam member 52 (i.e. the input shaft 30). When this occurs, the input shaft 30 continues to rotate. Once it turns approximately 180° the offset between the first and second cam member has been cancelled; i.e. the central axes of the input shaft 30 and the second cam member 54 become aligned; see FIG. 5. When this happens all the gear teeth of the compound gear 64 are withdrawn from the internal gear surface of each ring gear; thus allowing input shaft 30 to continue to supply torque to the actuator 26 and 28 downstream of the jammed actuator 24. Just as important, the moving ring gear 34 which is attached to the load 12 is free to rotate with movement of the load 12. Hence, actuators 26 and 28 will continue to drive the load and actuator 24 will act as a hinge.

Various modifications to the depicted and described apparatus will be apparent to those skilled in the art. For example, any number of actuators could be used in series and any number of fixed and moving ring gears could be used to construct an actuator. Accordingly, the foregoing detailed description of the present invention should be considered exemplary in nature and not as limiting to the scope and spirit of invention as set forth in the appended claims.

Having described the invention with sufficient clarity that those skilled in the art may practice it:

I claim:

1. An actuator comprising:
    at least one moving ring gear having an internal gear surface;
    a fixed ring gear on each side of said at least one moving ring gear, each fixed ring gear having an internal gear surface defining a ring gear bore;
    a shaft extending through said ring gears including a first cam member rotatable with and secured thereon, the axis of said first cam member being offset from the axis of said shaft by a first amount of offset;

means for retaining said ring gears in a desired relationship which means are rotatable with said shaft;

bearing means, mounted within said means for retaining, for rotatably supporting said shaft;

a generally cylindrical second cam member having a bore therethrough, the axis of said bore is offset from the axis of said second cam member by a second amount of offset, said first cam member disposed within said bore of said second cam member and having said first amount of offset thereof being approximately equal to said second amount of offset;

shear means for transmitting torque from said first cam member to said second cam member below a desired torque level;

a needle bearing located around said second cam member; and a compound gear secured over said needle bearing, said compound gear having a number of gear tooth surfaces thereon, said number of gear tooth surfaces being equal to the total number of fixed and moving gear rings and in driving relationship therewith below said desired torque level of said shear means.

2. The actuator of claim 1 wherein said first cam member is formed integrally with said shaft.

3. The actuator of claim 1 wherein said shear means comprises:
a slot in said first cam member and a complimentary slot within said bore of said cylindrically shaped second cam member;
a shear member having a desired shear strength press fit between said first and said second cam members within said slots.

4. The actuator of claim 1 wherein each ring gear comprises:
a housing including the ring gear bore therein; and
an integral attachment member extending from said housing.

5. The actuator of claim 1 wherein said means for retaining comprises:
a threaded section on said shaft on both sides of said first cam member;
a side cover, including an opening therein, at each outermost side of said fixed ring gears, said bearing means secured within said side cover opening; and
a retainer, threadable onto said shaft against said bearing means.

6. An actuator comprising:
at least one moving ring gear;
at least two fixed ring gears, one fixed ring gear on each side of said at least one moving ring gear, each moving and fixed ring gear having an internal gear toothed surface;
gear means, engageable with said fixed and moving ring gears, for drivingly rotating said moving ring gear with respect to said fixed ring gears, and for maintaining relative angular positioning of said moving ring gear with respect to said fixed ring gears;
an input shaft extending through said ring gears, said gear means disposed about said input shaft in driven relationship therewith;
cam means, interposed between said gear means and said input shaft, for progressively engaging said gear means into and out of contact with a portion of said internal gear tooth surfaces of said fixed and moving ring gears as said input shaft rotates, and for causing disengagement of said gear means from said ring gears upon achieving a predetermined torque load; and
bearing means for rotatably supporting said shaft.

7. The actuator of claim 6 further including means for disengaging said input shaft from said gear means.

8. The actuator of claim 7 wherein said cam means comprises:
an inner cam member rotatable with and secure on said input shaft, the axis of said inner cam member being offset from the axis of said input shaft by amount X;
an outer cylindrically shaped cam member having a bore therethrough, the axis of said bore is offset from the axis of said outer cam member by an amount Y, said amount X being approximately equal to amount Y, said inner cam member disposed within said bore of said outer cam member.

9. The actuator of claim 8 wherein said means for disengaging comprises:
complimentary slots formed in said inner and outer cam members;
a shear member interference fit within said slots to maintain the relative angular position of said inner cam member and said outer cam member for torque loads below a predetermined level.

10. The actuator of claim 6 wherein said bearing means is a ball bearing having an inner and an outer race with a plurality of balls captured therebetween.

11. The actuator of claim 10 further comprising:
a side cover on each outermost side of said fixed ring gear, said side covers including a bore therethrough for location of said bearing means; and
a retainer, threadable onto said input shaft, to retain each of said inner races of said ball bearings, thereby securing said inner race between said retainer and said inner cam member.

12. An actuator comprising:
alternating fixed and moving ring gears in side-by-side relationship to one another, each ring gear having a bore therethrough and an internal gear toothed surface circumferentially around said bore, bores of said fixed and moving ring gears are coaxially aligned, said moving ring gear rotatable with respect to said fixed ring gears around the centerline of said bore;
a shaft extending through said bores in said fixed and moving ring gears;
bearing means for rotatably supporting said shaft;
a cam member on that portion of said shaft within said fixed and moving ring gear, the axis of said cam member and said shaft being offset from one another;
a cylindrical sleeve member having a bore therethrough, the axis of said sleeve member bore being offset from the axis of said sleeve member, said axis offset between said shaft and said cam member being approximately equal to the axis offset of said sleeve member and said sleeve member bore;
said sleeve member mounted to rotate with said cam such that said axis of said sleeve member is offset from, the axis of said shaft by the amount equal to the axis offset of the shaft and the cam member and the axis offset of the sleeve member and sleeve member bore;
a compound gear disposed about and axially concentric with said sleeve member, said compound gear having external gear toothed surfaces to engage each fixed and moving gears, said compound gear thereby arranged to be precessed into engagement with successive of said gear teeth of said fixed and moving ring gears with rotation of said shaft to cause relative rotation of said moving ring gears with respect to said fixed ring gears.

13. The actuator of claim 12 wherein said shaft includes threads thereon on both sides of said cam member and said cam member has a shoulder on each axial end thereof.

14. The actuator of claim 13 further including means for retaining said fixed and moving ring gears in fixed axial relationship to said shaft.

15. A system for moving a load with respect to a fixed point, said system comprising:
at least two actuator means for moving said load;
a motor;
a shaft, rotatably driven by said motor and powering said at least two actuator means;
means for disconnecting said shaft from one of said at least two actuator means when said one actuator means jams without disconnecting any other at least two actuator means from said shaft;
at least one moving ring gear;
at least two fixed ring gears, one fixed ring gear on each side of said at least one moving ring gear, each moving and fixed ring gear having an internal gear toothed surface;
gear means, engageable with said internal gear toothed surfaces of said fixed and moving ring gears, for rotating said moving ring gear with respect to said fixed ring gears;
an input shaft extending through said fixed and moving ring gears, said gear means disposed about said input shaft for driven rotation thereby;
cam means, interposed between said gear means and said input shaft, for progressively engaging said gear means into and out of contact with a portion of said internal gear tooth surfaces of said fixed and moving ring gears as said shaft rotates and for causing disengagement of said gear means from ring gears upon achieving a predetermined torque load; and bearing means for rotatably supporting said shaft.

16. The system of claim 15 wherein said load is an aircraft control surface.

17. The actuator of claim 16 wherein said means for disconnecting includes a means for disengaging said input shaft from said gear means.

18. The actuator of claim 17 wherein said cam means comprises:
an inner cam member rotatable with and secure on said input shaft, the axis of said inner cam member being offset from the axis of said input shaft by amount X;
an outer cylindrically shaped cam member having a bore therethrough, the axis of said bore is offset from the axis of said outer cam member by an amount Y, said amount X being approximately equal to amount Y, said outer cam member adapted for rotation with said inner cam member.

19. The actuator of claim 18 further including:
complimentary slots formed in said inner and outer cam members; and
a shear member interferences fit within said slot to transmit driving force from said inner cam member to said outer cam member.

20. The actuator of claim 19 wherein said bearing means is a ball bearing having an inner and an outer race with a plurality of balls captured therebetween.

21. The actuator of claim 20 further comprising:
threads on the shaft located on both sides of the inner cam member;
a shoulder formed in said inner cam member on each end thereof; and
a pair of retainer means threaded unto said shaft on both sides of said inner cam member to secure said inner race of said bearing between said retainers and said inner cam members.

22. The actuator of claim 21 further comprising:
means for covering the outermost sides of said fixed ring gears, said outer race of said ball bearings secured to said means for covering, said pair of retainer means coaxially locating said alternating fixed and moving ring gears in side-by-side relationship with respect to said shaft.

* * * * *